(12) United States Patent
Farley et al.

(10) Patent No.: US 7,701,905 B2
(45) Date of Patent: *Apr. 20, 2010

(54) EMPLOYING SIMULATED ACKNOWLEDGMENT SIGNALS FOR EFFICIENT HANDOFFS IN CELLULAR PACKET NETWORKS

(75) Inventors: Kevin L. Farley, Orlando, FL (US); Lawrence Robert Foore, Palm Bay, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/682,766

(22) Filed: Mar. 6, 2007

(65) Prior Publication Data

US 2007/0147305 A1    Jun. 28, 2007

Related U.S. Application Data

(63) Continuation of application No. 09/823,288, filed on Mar. 30, 2001, now Pat. No. 7,187,666.

(51) Int. Cl.
*H04Q 7/00* (2006.01)
(52) U.S. Cl. .................. 370/331; 370/338; 455/436
(58) Field of Classification Search .......... None
See application file for complete search history.

(56) References Cited

U.S. PATENT DOCUMENTS

| | | | |
|---|---|---|---|
| 4,527,267 A | 7/1985 | Cohen | |
| 6,473,411 B1 | 10/2002 | Kumaki et al. | |
| 6,546,425 B1 * | 4/2003 | Hanson et al. | 709/227 |
| 6,553,032 B1 | 4/2003 | Farley et al. | |
| 6,601,101 B1 | 7/2003 | Lee et al. | |
| 6,657,984 B1 | 12/2003 | Semper | |
| 6,687,500 B1 | 2/2004 | Causey | |
| 6,704,571 B1 | 3/2004 | Moon | |
| 6,763,007 B1 | 7/2004 | LaPorta et al. | |
| 6,832,093 B1 * | 12/2004 | Ranta | 455/456.4 |
| 6,876,639 B1 * | 4/2005 | Cao | 370/331 |
| 6,882,637 B1 * | 4/2005 | Le et al. | 370/349 |
| 2002/0101839 A1 | 8/2002 | Farley et al. | |
| 2004/0090936 A1 * | 5/2004 | Cuny et al. | 370/331 |
| 2005/0013245 A1 * | 1/2005 | Sreemanthula et al. | 370/229 |

* cited by examiner

*Primary Examiner*—Chi H. Pham
*Assistant Examiner*—Shick Hom
(74) *Attorney, Agent, or Firm*—Volpe and Koenig, P.C.

(57) ABSTRACT

An improved arrangement is described for maintaining throughput of date packets over a cellular packet network from an Internet server to an end user machine during handoff of a mobile subscriber unit from a first base station to a second base station. The end user machine conventionally generates, in response to successive bytes from the server, acknowledgment signals including here applicable a "zero" acknowledgment signal that advertises a closed receive window at the end user machine and that is effective to pause transmission of data from the server. In response to a handoff start signal from the subscriber unit, a gateway unit associated with the first base station sends to the server a simulated zero acknowledgment signal to pause such transmission. Upon completion of handoff, an actual non-zero acknowledgment signal stored at the gateway unit at the start of handoff is applied to the server to resume transmission from the server to the end user machine.

7 Claims, 3 Drawing Sheets

EMPLOYING SIMULATED ACKNOWLEDGMENT SIGNALS FOR EFFICIENT HANDOFFS IN CELLULAR PACKET NETWORKS

CROSS REFERENCE TO RELATED APPLICATION

This application is a continuation of U.S. patent application Ser. No. 09/823,288 filed Mar. 30, 2001 now U.S. Pat. No. 7,187,666, which is incorporated by reference as if fully set forth.

BACKGROUND OF THE INVENTION

This invention relates to data communication systems for interconnecting an end user machine with a remote server (e. g., an Internet server) for the two-way transmission of data packets. More particularly, the invention relates to wireless communication links, such as cellular packet networks, in which mobile subscriber units may be switched between base stations.

A communication system of this type typically transports a sequence of data packets over a TCP connection or the like between an end user machine coupled to the subscriber unit and a server (e. g., an Internet server) coupled to the base stations through a fixed network. In the wireless portion of such system, data packets from the server flow to the subscriber unit through the base station that registers the strongest signal strength as measured, e. g., by a beacon or pilot signal received by the subscriber unit. If a subscriber unit that is initially serviced by a first base station roams through an area where the signal strength is stronger from a second base station, the subscriber unit typically requests a change of transmission path (e. g., a "handoff") from the first base station to the second station.

Propagation delays, data bit errors and the like are normal on wireless communication links. Such phenomena can cause loss or delay of acknowledgment signals that are successively generated by the end user machine in response to successive bytes contained in data packets received by the end user machine from the server. Each acknowledgment signal contains a first identifying portion indicative of the corresponding byte received by the end user machine and a second portion advertising the then-current size of the receive window of the end user machine.

The loss or delay of acknowledgment signals is often interpreted as congestion on the network by the applicable TCP protocols which were designed primarily for end-to-end wired networks. As a result, the server may be switched into a so-called congestion avoidance or slow-start mode, which can drastically reduce throughput of data packets on the system even when no congestion is present.

While known techniques involving, e. g., modification of the network protocols, attempt to mitigate the effects of such loss of throughput in wireless systems, they frequently add complexity such as the splitting of the TCP connection between the end user machine and the server. More importantly, the effectiveness of such techniques is greatly diminished during periods of handoff.

SUMMARY OF THE INVENTION

The present invention maintains throughput of data packets from the server to the end user machine during handoff by artificially invoking the server's persist mode to pause transmission of data packets from the server. Such mode is normally invoked, pursuant to TCP protocols, when the capacity of the end user machine to receive additional bytes from the server falls below a threshold. This condition is indicated to the server when it receives, from the end user machine, an acknowledgment signal whose second portion is zero (hereafter "zero acknowledgment signal").

In an illustrative embodiment of the invention, a gateway unit associated with the base station then servicing the end user machine intercepts the succession of acknowledgment signals generated by the end user machine. The gateway unit stores the actual acknowledgment signal for the currently intercepted (Nth) byte while forwarding to the server a copy of the acknowledgment signal for the previous (N-1)th byte. In response to a handoff start signal from the subscriber unit, the gateway unit generates a replica of the intercepted acknowledgment signal for the Nth byte but with its second portion set equal to zero, thereby simulating a zero acknowledgment signal which is forwarded to the server to trigger its persist mode. Upon completion of handoff, the stored actual acknowledgment signal for the Nth byte is transmitted to the server by the gateway unit. This reopens the transmit window of the server so that normal transmission of data packets can resume to the end user machine.

In order to assure that transmission of data packets can also take place with no loss of throughput in the opposite direction, a similar gateway unit may be associated with the subscriber unit. The latter gateway unit sends a simulated zero acknowledgment signal to the end user machine to pause transmission of data packets to the server when handoff is initiated.

BRIEF DESCRIPTION OF THE DRAWING

The invention is further illustrated in the following detailed description taken in conjunction with the appended drawing, in which.

DETAILED DESCRIPTION OF THE PREFERRED EMBODIMENTS

Figure 1:
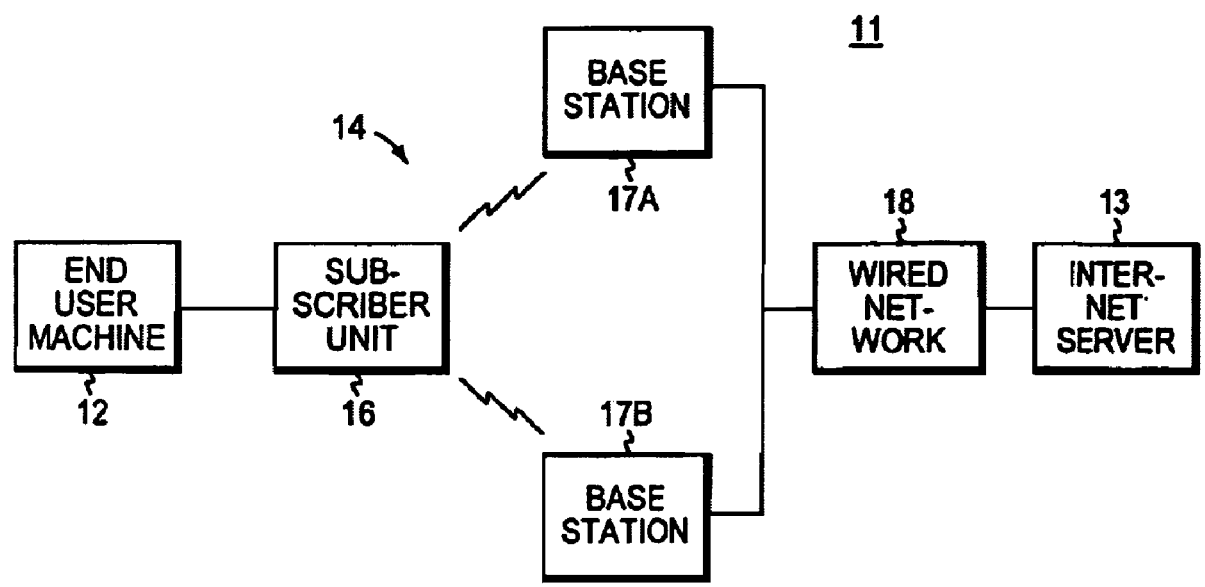
FIG. 1 is a block diagram illustrating a wireless data communication system in which the invention may be implemented.

Referring to the drawing, FIG. 1 shows a data communication system 11, illustratively a cellular packet network, for the two-way transmission of digital data packets between an end user machine 12 and an Internet server 13. The system 11 includes a wireless link 14 that employs a subscriber unit 16 connected to the end user machine 12.

The end user machine 12 may be a laptop computer, a portable computer, a personal digital assistant (PDA), or the like, which may be moved from place to place.

The link 14 also includes a plurality of base stations 17, two of which (identified as 17A and 17B) are illustrated. The base stations 17A and 17B are connected to the server 13 through a wired network 18, illustratively the public switched telephone network.

For purposes of transmitting data packets through the wireless link 14, radio communication may be established between the subscriber unit 16 and a selected one of the base stations 17A and 17B. For purposes of this description, it will be assumed that such communication is initially established through the base station 17A. Handoff of the subscriber unit 16 from base station 17A to base station 17B as the subscriber unit 16 "roams" is implemented in a normal manner in accordance with the relative strength of a beacon or pilot signal transmitted to the subscriber unit from each of such base stations. In particular, if the signal strength from the base station 17B as measured at the subscriber unit 16 is determined to be sufficiently greater than that of the base station 17A for more than a certain period of time, the subscriber unit 16 will request a change ("handoff") from the base station 17A to the base station 17B. During execution of such handoff, the subscriber unit 16 thereafter generates a handoff start signal and handoff complete signal which are utilized as indicated below. The generation of such signals from the subscriber unit 16 may advantageously be undertaken under the supervision of an RLP controller (not shown) which operates in accordance with the Radio Link Protocol.

While not specifically illustrated in the drawing, it will be understood that in a conventional manner the subscriber unit 16 may also form the mobile node of a Mobile IP home network, which may be an Internet service provider. In such case, the subscriber unit 16 is assigned a Mobile IP address by a home agent of the home network. Such home agent intercepts data packets that are transmitted by the server 13 and bear the subscriber unit's Mobile IP address. After encapsulating the data packets from the server 13 into Mobile IP packets in accordance with Mobile IP protocols, the home agent routes them to a foreign agent that is associated with the base station 17A and is registered with the home agent as a "binding" for the subscriber unit 16. Such foreign agent unencapsulates the Mobile IP packets and sends them on to the subscriber unit 16 through the base station 17A.

In the event of a hand-off of the subscriber unit 16 from base station 17A to base station 1713, the switched network 18 conventionally updates the packet routing so that the home agent will thereafter route the Mobile IP-encapsulated packets bearing the subscriber unit's Mobile IP address to a different foreign agent that is associated with the base station 17B. The new foreign agent is registered with the home agent 21 as another "binding" for the subscriber unit 17, while the first foreign agent is de-registered. The new foreign agent unencapsulates the intercepted Mobile IP data packets which are currently transmitted by the home agent and sends them on to the subscriber unit 16 through the base station 17B.

Two-way data packet communication between the end user machine 12 and the server 13 may be conventionally set up by utilizing suitable application software (not shown) associated with the machine 12 to establish a single TCP connection over the data communication system 11. Once established, the TCP session may be carried out over such connection using conventional TCP protocols. When such TCP session is in effect, successively numbered data packets from the server 13, typically IP (Internet Protocol) data packets, are conventionally combined with TCP headers, verification bits, etc., and transmitted over the switched network 18 and the wireless link 14 to the end use machine 12, and vice versa. (For ease of description, it will be assumed that the data packets are directed from the server 13 to the end user machine 12, unless otherwise indicated.) Where appropriate, the resulting packets may conventionally be further encapsulated in headers associated with additional protocols, such as the Layering 2 Tunneling Protocol (L2TP) to enable the TCP session to be extended across the Internet.

Successive bytes in the data packets from the server 13 arriving at the end user machine 12 will, in further accordance with applicable TCP protocols, trigger successive acknowledgment signals from the machine 12. Under the initial conditions assumed in this description, such acknowledgment signals are transmitted to the server 13 through the subscriber unit 16, the first base station 17A, and the wired network 18.

If a particular byte transmitted from the server 13 fills up the data buffer of the end user machine 12, the corresponding acknowledgment signal will be a zero acknowledgment signal, i. e., its second portion will be equal to zero. When the server 13 receives such zero acknowledgment signal from the machine 12, the applicable protocols dictate that the server will be placed in its persist mode. In such mode, further data transmission from the server is paused until the server receives a subsequent acknowledgment signal whose second portion is greater than zero. This indicates that the receive window of the end user machine 12 is open again.

In practice, wireless transmission paths exemplified by the link 14 are susceptible to propagation delays, bit errors and data loss which are much greater than those exhibited by a fixed end-to-end wired network. These problems are magnified during handoff. As a result, acknowledgment signals from the end user machine 12 may not arrive as expected at the server 13 within an expected time, if at all. In such case the TCP protocols governing the data connection in question conventionally trigger a congestion or slow-start mode at the server 13 which can significantly cut down throughput of data packets from the server even when the end user machine 12 is prepared to receive normal data flow.

Figure 2:
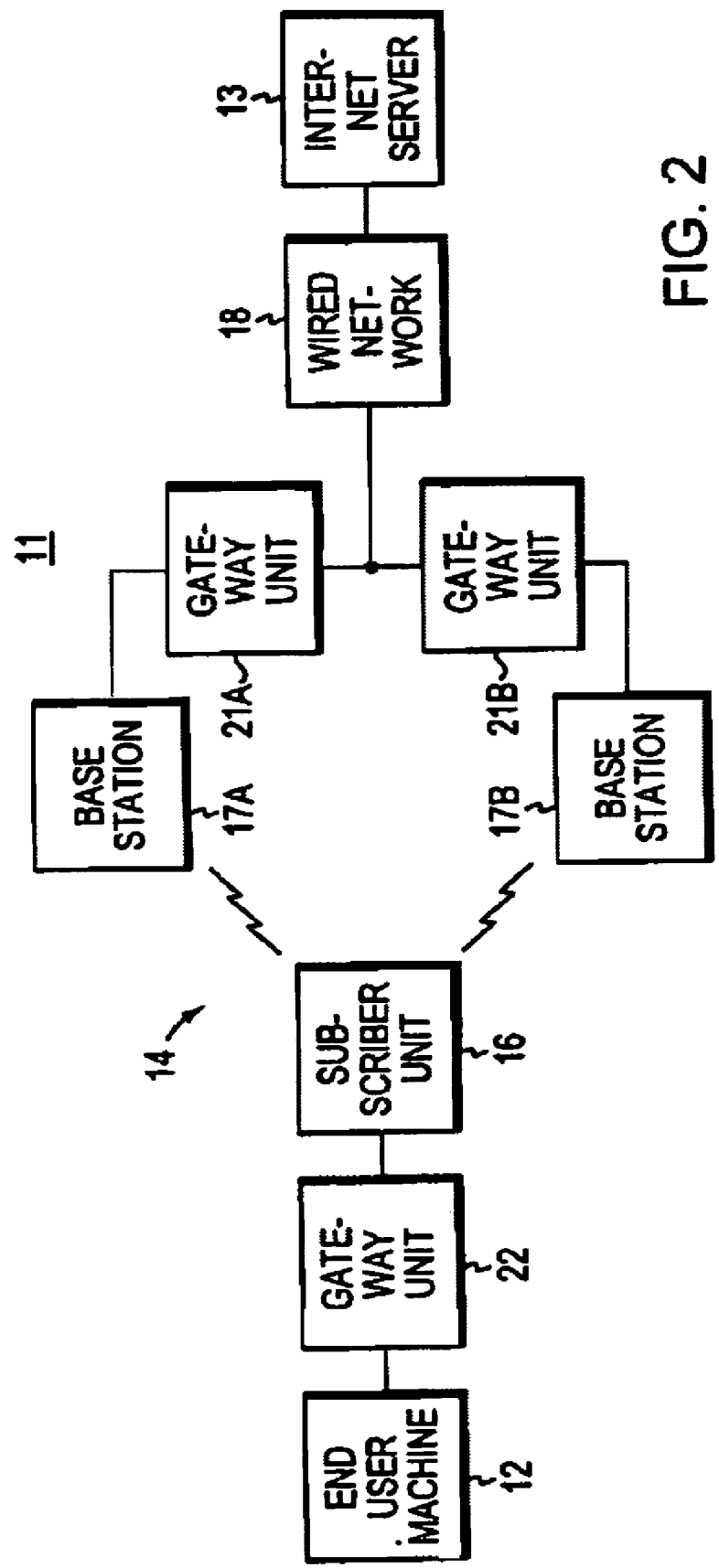
FIG. 2 is a block diagram of a communication system similar to that of FIG. 1 and which incorporates gateway units in accordance with the invention.

FIG. 2 shows the communication system 11 of FIG. 1 in which an implementation of the invention is incorporated for minimizing the above-mentioned problems. (Corresponding components in FIGS. 1 and 2 have been given corresponding reference numerals.)

A pair of gateway units 21A and 21B (FIG. 2) are respectively associated with the base stations 17A and 17B, and an internally similar gateway unit 22 is associated with subscriber unit 16. As will be explained in more detail in connection with FIG. 3, the gateway unit 21 associated with the base station 17 then servicing the end user machine 12 intercepts the succession of acknowledgment signals generated by the end user machine. Such gateway unit 21 stores the actual acknowledgment signal for the currently intercepted Nth byte while forwarding to the server 13 the acknowledgment signal for the (N-1)th byte.

The gateway unit 21A further includes facilities which generate, in response to a handoff start signal from the subscriber unit 16 coupled thereto from the associated base station 17A, a first simulated acknowledgment signal whose first portion is identical to that of the intercepted actual acknowledgment signal for the Nth byte, and whose second portion is set to zero. In other words, the simulated acknowledgment signal is a zero acknowledgment signal. Such simulated acknowledgment signal is applied to the server 13 through the wired network 18. The server 13 responds to such signal by pausing (i.e., shutting down its transmit window) so that it transmits no further data packets until the server receives an acknowledgment signal whose second portion indicates that the receive window of the end user machine 12 is open. The simulated zero acknowledgment signal causes the server to stop transmission even if, as is the usual case, the actual received window of the end user machine is open wide enough to continue receiving data.

Figure 3:
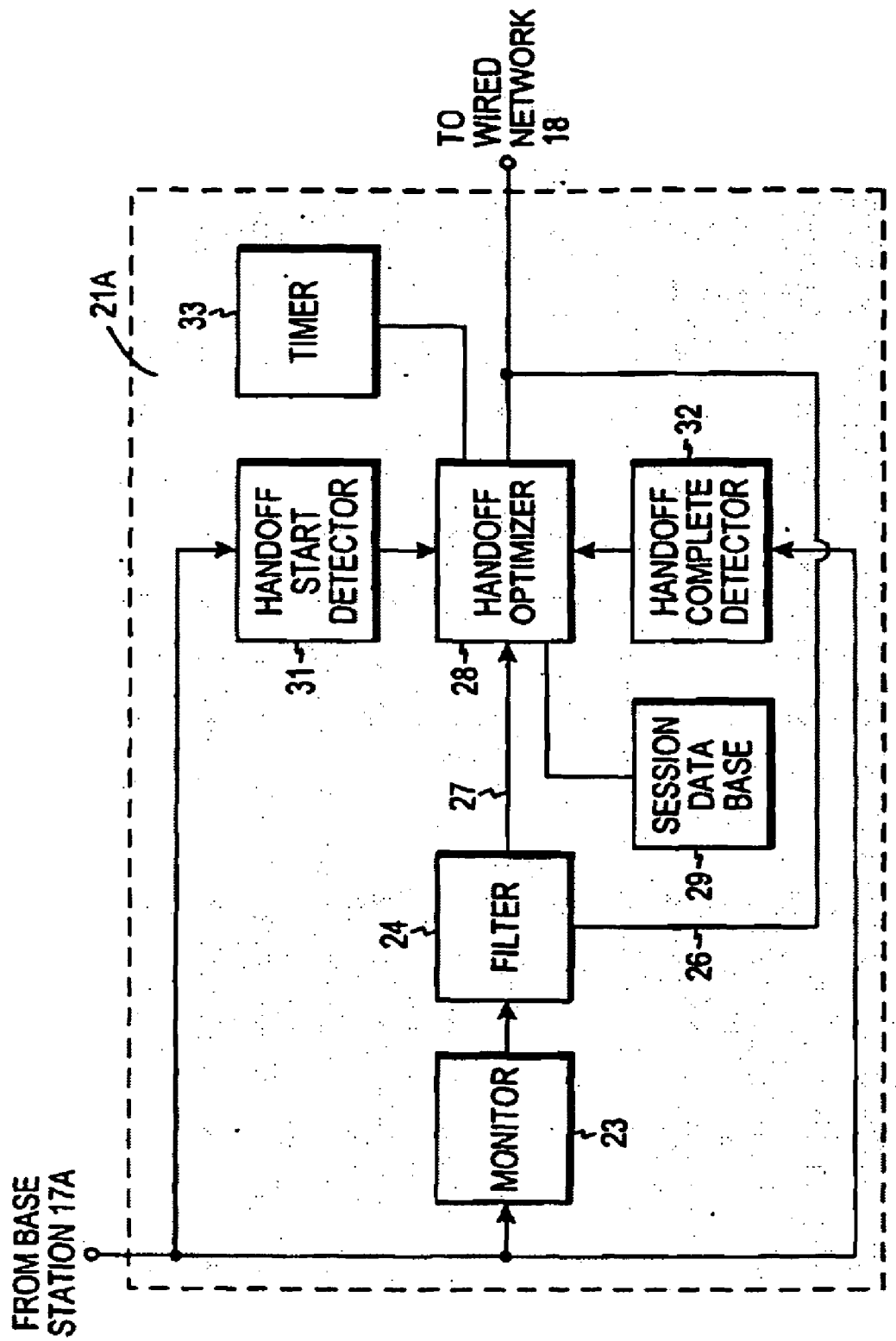
FIG. 3 is a representation of one embodiment of a base station gateway unit in accordance with the invention.

The gateway unit 21A is also provided with facilities which, in response to a signal from the subscriber unit 16 that handoff is complete, retrieves the stored actual acknowledgment signal for the Nth byte and forwards it to the server 13. Since such retrieved acknowledgment signal is indicative of a non-zero receive window state of the end user machine 12, the application of such stored signal to the server will serve to immediately re-open the transmit window. As a result, the server will resume data transmission to the end user machine over the still-established single TCP connection (this time through the second base station 17B, since handoff is complete). Such transmission will occur at a rate dictated by the receive window size of the machine 12 as indicated by the second portion of the retrieved acknowledgment signal FIG. 3 shows an illustrative embodiment of the gateway unit 21A associated with the base station 17A. (It will be understood that the gateway unit 21B associated with the base station 17B may be constructed and operated in a similar manner.) The gateway unit 21A includes a sensing device 23 which intercepts and monitors actual acknowledgment signals returned from the end user machine 12 (FIG. 2) through the base station 17A in response to successive bytes in the data packets transmitted from the server 13. It will be understood by those skilled in the art that the packets being monitored may include not only such acknowledgment signals but also other packets, destined for the server 13, which flow through the base station 17A from other customers that are being serviced by such base station. The gateway unit 21 may include a suitable filter 24 (FIG. 3) coupled to the output of the sensing device 23 to filter out all the monitored packets that are not acknowledgment signals from the end user machine 12. (The manner in which the filtering is done is conventional and may involve, e. g., inspecting the headers of the incoming packets and rejecting those that do not exhibit the indicia of the desired TCP acknowledgment signals). Such extraneous packets are coupled over a first filter output 26 through the wired network 18 to the server 13 (FIG. 2) without being further processed in the gateway unit 21. The successive acknowledgment signals originating at the end user machine 12 are coupled over a second filter output 27 to a handoff optimizer 28 (FIG. 3).

During steady-state conditions when normal throughput is being maintained on the wireless link 14 and the subscriber unit 16 is not being handed off from one base station to another, the optimizer 28 responds to the current intercepted acknowledgment signal for the Nth byte as applied thereto from the filter output 27 by forwarding, to the server 13 via wired network 18, a copy of the previously intercepted acknowledgment signal for the (N-1)th byte. The optimizer 28 also stores a copy of the currently intercepted acknowledgment signal for the Nth byte in a session data base 29, to be retrieved in the manner indicated below.

When the subscriber unit 16 is handed off from base station 17A to base station 17B, a handoff start signal from the subscriber unit 16 is applied to a detector 31 of the gateway unit 21A through the base station 17A. The output of the detector 31 is applied to the optimizer 28. In accordance with the invention, the optimizer 28 responds to the detected handoff start signal by setting, to zero, the second portion of the currently intercepted acknowledgment signal for the Nth byte to simulate a zero acknowledgment signal. When such simulated signal is applied to the server 13 (FIG. 2) through the wired network 18, the server 13 is "tricked" into its persist mode, thereby closing its transmit window.

When the handoff is complete, the subscriber unit 16 generates a handoff complete signal which is applied to a detector 32 (FIG. 3) of the gateway unit 21A. The output of the detector 32 is applied to the optimizer 28. The optimizer responds to the detected handoff complete signal by retrieving, from the session database 29, the stored copy of the actual acknowledgment signal for the Nth byte and transmitting it to the server 13 (FIG. 2) via the wired network 18. When the server 13 receives such retrieved actual acknowledgment signal, the "paused" transmit window in the server will re-open, and the server will restart transmission of data packets to the end user machine 12 over the new wireless connection through the base station 17B.

The optimizer 28 (FIG. 3) may also be instructed to issue a simulated zero acknowledgment signal upon the timeout of a specially set TCP stream timer 33 associated with the optimizer 28. Specifically, the timer 33 is set to time out just prior to the time at which, according to TCP protocols, the server 13 would normally time out and initiate one of its congestion avoidance modes for failure to timely receive an acknowledgment signal. Such mode of operation is more fully described in copending application Ser. No. 09/777,557 filed Feb. 5, 2001, entitled "Link Aware Transmission Control Protocol" and assigned to the assignee of the present invention.

The gateway unit 22 (FIG. 2) associated with the subscriber unit 16 may be implemented in a manner exactly parallel to that just described for processing acknowledgment signals coming from the opposite direction. In particular, the gateway unit 22 is arranged to (a) intercept packet sequences coming from the server 13; (b) extract from such sequences the relevant acknowledgment signals generated by the server 13 in response to successive bytes in data packets originating at the end user machine 12; (c) generate a simulated zero acknowledgment signal at the start of a handoff for application to the machine 12, thereby triggering its persist mode; (d) store the then-intercepted actual acknowledgment signal for the Nth byte, and (e) forward such stored actual acknowledgment signal to the machine 12 to reopen its transmit window when handoff is complete. In the foregoing, the invention has been described, in part, in connection with an exemplary embodiment thereof. Many variations and modification will now occur to those skilled in the art. It is accordingly desired that the scope of the appended claims 20 not be limited to or by the specific disclosure herein contained.

What is claimed is:

1. A method for data packet delivery to a subscriber unit during handoff from a first base station to a second base station, the method comprising:

receiving subscriber unit acknowledgements of transmitted data packets;

buffering the received subscriber unit acknowledgements;

pausing data packet delivery on a condition that detecting a handoff has commenced;

forwarding the buffered subscriber unit acknowledgements on a condition that handover is completed.

2. The method of claim 1, wherein pausing data packet delivery further comprises:

detecting a zero acknowledgement signal instead of the buffered acknowledgement of received data packets;

wherein upon detection of the zero acknowledgement signal, data packet transmission is paused.

3. The method of claim 1, wherein the data packets are delivered to the subscriber unit sequentially.

4. The method of claim 1, wherein the data packets are delivered to the subscriber unit in accordance with transport control protocol (TCP).

5. The method of claim 4, wherein the subscriber unit acknowledgement forwarded after completion of handoff is not the subscriber unit acknowledgement most currently buffered.

6. The method of claim 1, wherein pausing data packet delivery on a condition that handoff commences further comprises detecting a handoff required signal.

7. A serving base station for data packet delivery to a subscriber unit during handover to a target base station, the serving base station comprising:

a sensor device for monitoring received subscriber unit acknowledgements of transmitted data packets;

a detector for detecting a condition that handover to the target base station has commenced and completed;

a session database for storing received subscriber unit acknowledgements until detection of an optimizer for pausing data packet delay using a simulated zero acknowledgement on a condition that handoff has been detected; and delivering the data packets on a condition that detection of the completion of handover using the stored subscriber unit acknowledgement has occurred.

* * * * *

UNITED STATES PATENT AND TRADEMARK OFFICE
CERTIFICATE OF CORRECTION

PATENT NO. : 7,701,905 B2  Page 1 of 1
APPLICATION NO. : 11/682766
DATED : April 20, 2010
INVENTOR(S) : Farley et al.

It is certified that error appears in the above-identified patent and that said Letters Patent is hereby corrected as shown below:

ON THE TITLE PAGE

Item (56), OTHER PUBLICATIONS, page 1, right column, after the line beginning with "*cited by examiner", insert the following:

--Networks," http://nms.lcs.mit.edu/~hari/papers/winet.ps, pp. 1-19 (1995)

BAKRE ET AL., "I-TCP: Indirect TCP for Mobile Hosts," http: 4itcp.pdf, pp. 1-18 (October 1994).--

Signed and Sealed this
Twenty-fifth Day of September, 2012

David J. Kappos
*Director of the United States Patent and Trademark Office*